June 11, 1968 H. A. RAHMEL ET AL 3,387,797
TAPE RECORDER
Filed Oct. 22, 1965 11 Sheets-Sheet 1

*INVENTORS:*
HENRY A. RAHMEL
WILLIAM L. GRUBE,
*BY,*
Mason, Kolehmainen, Rathburn & Wyss,
ATTORNEYS.

TAPE RECORDER

INVENTORS:
HENRY A. RAHMEL
WILLIAM L. GRUBE,
BY,
Mason, Kolehmainen, Rathburn & Wyss,
ATTORNEYS.

INVENTORS:
HENRY A. RAHMEL
WILLIAM L. GRUBE,
BY,
Mason, Kolehmainen, Rathburn & Wyss,
ATTORNEYS.

June 11, 1968 H. A. RAHMEL ET AL 3,387,797

TAPE RECORDER

Filed Oct. 22, 1965 11 Sheets-Sheet 4

INVENTORS:
HENRY A. RAHMEL
WILLIAM L. GRUBE,

BY, Mason, Kolehmainen, Rathburn & Wyss,
ATTORNEYS.

*INVENTORS:*
HENRY A. RAHMEL
WILLIAM L. GRUBE,

BY,

Mason, Kolehmainen, Rathburn & Wyss,
ATTORNEYS.

TAPE RECORDER

Filed Oct. 22, 1965 11 Sheets-Sheet 6

INVENTORS:
HENRY A. RAHMEL
WILLIAM L. GRUBE,

BY, Mason, Kolehmainen, Rathburn & Wyss,
ATTORNEYS.

TAPE RECORDER

INVENTORS:
HENRY A. RAHMEL
WILLIAM L. GRUBE,
BY,
Mason, Kolehmainen, Rathburn & Wyss,
ATTORNEYS.

June 11, 1968 H. A. RAHMEL ET AL 3,387,797

TAPE RECORDER

Filed Oct. 22, 1965 11 Sheets-Sheet 8

INVENTORS:
HENRY A. RAHMEL
WILLIAM L. GRUBE,

BY,

Mason, Kolehmainen, Rathburn & Wyss,

ATTORNEYS.

INVENTORS:
HENRY A. RAHMEL
WILLIAM L. GRUBE,

BY,

Mason, Kolehmainen, Rathburn & Wyss,

ATTORNEYS.

June 11, 1968 H. A. RAHMEL ET AL 3,387,797

TAPE RECORDER

Filed Oct. 22, 1965 11 Sheets-Sheet 10

INVENTORS:
HENRY A. RAHMEL
WILLIAM L. GRUBE,

BY,

Mason, Kolehmainen, Rathburn & Wyss,

ATTORNEYS.

TAPE RECORDER

Filed Oct. 22, 1965 11 Sheets-Sheet 11

INVENTORS:
HENRY A. RAHMEL
WILLIAM L. GRUBE,
BY,
Mason, Kolehmainen, Rathburn & Wyss,
ATTORNEYS.

United States Patent Office 3,387,797

Patented June 11, 1968

3,387,797

TAPE RECORDER

Henry A. Rahmel, Evanston, and William L. Grube, Northbrook, Ill., assignors to A. C. Nielsen Company, Evanston, Ill., a corporation of Delaware Filed Oct. 22, 1965, Ser. No. 501,360
22 Claims. (Cl. 242—55.11)

ABSTRACT OF THE DISCLOSURE

A wave signal receiver monitor is provided with means for recording the indicia on a tape reel. A constant torque clutch for the tape reel is provided to pretension the tape and obtain uniformly accurate spacings of the recorded characters. A step by step advance of the tape is accomplished through an eccentric and ratchet wheel arrangement. A takeup spindle for the tape cartridge is slightly overdriven. Moreover a tension release mechanism for the tape recorder is provided during the cutting and removal of the recorded tape and suitable means are provided for cutting the tape and winding the recorded tape on a tape cartridge. To facilitate the changing of the tape cartridges, a self-feeding cartridge is provided.

The present invention relates to a tape recorder, and, more particularly, to a tape recorder for use in an apparatus of the type for monitoring wave signal receivers, and, more specifically, for monitoring one or more television receivers in the home to determine the program to which the receiver is tuned.

It has become commercially important in the television industry to survey the received programs to ascertain a comparison or rating of the programs with respect to the listening audience. One method of conducting such surveys is the installation of a monitoring device in the home which will record periodic station identification records of the television receivers in the home. In order to perform the survey commercially, it is necessary that the recorder be cheap enough to install and operate in local markets and at the same time to provide the periodic station identification records. It is desirable to reduce the labor in the field to a minimum. Such a reduction of labor can come about by requesting the housewife to perform some of the functions, providing a monitor that requires a minimum of maintenance, and depending upon government mail service for delivery of the information to the processing office. The housewife, for example, may be requested to perform the functions of cutting off the tape of a tape recorder, removing the take-up spool, recording on the mailing tag the end time of the tape (the time of cutting the tape), putting on a new take-up spool, putting the removed take-up spool into the mailing bag and posting the mailing bag. While this requires some effort on the part of the housewife, it minimizes the expense of conducting the survey.

One of the difficulties encountered in a comparatively inexpensive monitor of the magnetic tape type which will allow recording of characters of uniformly accurate spacing. To accomplish this, an intermittent motion very similar to that of a motion picture camera is employed. In order to properly guide the tape, however, a certain constant amount of tension is needed along the entire tape path. Two problems then arise; first, when dealing with extremely low linear velocities and intermittent motion, a "stick-slip" motion occurs which is quite random and unpredictable in its behavior. The cause of this phenomenon of static versus kinetic friction which is inherent in almost every material is not yet fully understood. Secondly the magnetic tape is a very thin elastic ribbon which can be stretched a significant amount with comparatively little force. Recording on such a medium under tension is very much like trying to write on a rubber band while it is being intermittently stretched. These two problems are much interrelated, one tending to encourage the other.

To be able to guide magnetic tape without placing it under tension would require a much more sophisticated and expensive guide system than is practical for monitoring application. Therefore, since it is necessary to use tension producing tape stretch, it is necessary to insure that the tape stretch would be uniformly constant to produce a useable taped record. The simplest method found of accomplishing this is to let the tape be pulled from the supply which would be governed to produce a constant unvarying force.

Periodically a quantity of recorded tape has to be removed from the monitor and mailed to the processing facilities. This operation has to be simple and foolproof enough so that the housewife can do it correctly after having it demonstrated only once. This forecloses requiring any operation involving any more manual dexterity than a simple operation such as pushing a button, pulling a lever, or turning a knob. In order to perform the tape removal, it is necessary first that the recorder tape still within the workings of the unit must be fed out to an exterior point. This means that all tape along the tape path downstream from the recording head will, of course, have been recorded over a time interval previous to the time of tape removal and must be included in the tape supply. Since flexibility of tape removal intervals requires a continuous tape supply, cutting of the tape at a point beyond the last recording is necessary prior to its removal. All recorded tape must be fed into a compact lightweight container for handling and mailing and the unrecorded or leading edge of the next tape which was left behind after the cut must be provided with a means of threading itself. The recorder and remaining tape as a unit must be in condition to resume normal operation immediately. These operations must be indexed in the proper sequence and phase and a positive start-finish point provided. Moreover the container of recorded tape must be easily removable and an empty replacement container must be both self positioning and self threading.

In order to maintain uniform tape motion, constant tension must be maintained from the instant the recordings start. Whenever recorded tape is removed from the monitor, the remaining supply of unrecorded tape in the unit must remain in a threaded and tensioned or "ready to go" condition just as though no interruption had taken place. Components of the recorder itself must be in such a tensioned condition, for example, the drive capstan, being a rubber coated metal shaft in the instant monitor, will twist with respect to the tape drive if it is not "pretwisted" before the tape drive starts.

Moreover the drive for the take-up cartridge must accomplish two things. First it overdrives the cartridge at a faster rate than the drive capstan supplies tape. Secondly it supplies continuous tension to the tape once take-up has begun. The purpose of the overdrive is to position the cartridge in time for tape to enter the opening, then to insure engagement of pulling mechanism and tape regardless of the starting position thereof. Continuous tension must be supplied in an amount large enough to operate the pulling mechanism and form a first wrap of the tape around the cartridge hub on which all succeeding wraps of tape will wind. The tension must continue in order that the windup mechanism and wrap of tape can never be allowed to let go.

Accordingly one object of the present invention is to provide a new and improved magnetic tape recorder for use with a wave signal receiver monitor.

Yet a further object of the present invention is to provide a new and improved tape recorder.

Yet a further object of the present invention is to provide a tape recorder for a wave signal receiver monitor which is inexpensive to manufacture, install and maintain.

Yet a further object of the present invention is to provide a new and improved tape recorder for a wave signal receiver monitor which is comparatively simple to operate so that a housewife may perform some of the required tasks.

Yet a further object of the present invention is to provide a drive system for a tape recorder which will allow recordings of characters of uniformly accurate spacing.

Yet a further object of the present invention is to provide a tape recorder wherein the tape is pulled from a supply having a constant unvarying force.

Yet a further object of the present invention is to provide a new and improved means of cutting recorded tape.

Yet a further object of the present invention is to provide new and improved tape recorder wherein the remaining supply of unrecorded tape in the tape recorder after removal of the recorded tape remains in a threaded and tensioned condition just as though no interruption had taken place.

Yet a further object of the present invention is to provide a new and improved self feeding take-up cartridge for a magnetic tape recorder.

Further objects and advantages of the present invention will become apparent as the following description proceeds and the features of novelty which characterize the invention will be pointed out with particularity in the claims annexed to and forming a part of this specification.

In accordance with these and many other objects of the present invention, there is provided a new and improved wave signal receiver monitor which is comparatively inexpensive and simple to operate. A constant torque clutch for the tape reel is provided to pretension the tape and obtain uniformly accurate spacings of the recorded characters. The constant torque clutch is based on the observation that when a belt is wrapped around a clutch cylinder through a sufficient angle, a large change in the coefficient of friction results in a relatively small change in torque on the cylinder. Accordingly the improvided constant torque clutch includes a belt wrapped around a clutch cylinder a plurality of times, with suitable tensioning means tensioning the belt. In one preferred embodiment of the invention, it was found that approximately three wraps of very fine stainless steel wire on a nylon or a molybdenum disulfide filled nylon cylinder gave very satisfactorily uniform torque and resulted in diminishing the stick-slip motion.

In accordance with another aspect of the present invention, the tape drive assembly for the tape recorder to advance the tape by driving the capstan thereof includes an eccentric drive wheel having a ratchet claw eccentrically pivoted thereon and biased into engagement with a ratchet wheel connected to the capstan. The eccentricity of the ratchet claw on the drive wheel is approximately one half the spacing of the teeth on the ratchet wheel so that one revolution of the eccentric drive wheel is effective to advance the ratchet wheel one tooth. A ratchet pawl engages the ratchet wheel to prevent reverse rotation of the ratchet wheel. A take-up spindle for a tape cartridge is belt driven from the ratchet wheel at a speed overdriving the cartridge relative to the speed of the capstan.

In accordance with yet another aspect of the present invention, there is provided a tension release mechanism for the tape recorder during the cutting and removal of the recorded tape. Specifically the tension release mechanism includes a tape guide eccentrically mounted on a crank and normally projected into the tape track to lengthen the path of the tape track and retractable to shorten the path thereof. Moreover a pressure roller normally holds the tape against the drive capstan. In accordance with the present invention, means are provided for releasing the pressure roller from engagement with the drive capstan to release the tape, and thereafter to rotate the crank selectively to project and retract the roller from the tape track, and means for releasing the torque on the constant torque clutch.

In accordance with yet another aspect of the present invention, means are provided for cutting the tape and winding the recorded tape on a tape cartridge on the take-up spindle. The tape cutting means includes a pinion gear mounted on the take-up spindle, and a multi-segmented manually driven segmented gear operatively associated with the pinion gear to intermittently drive the take-up cartridge. A tape cutter knife is provided and a tape cutter actuator cam is carried by the segmented gear operatively associated with the tape cutter knife to project the knife across the tape track. Manual rotation of the segmented gear is effective, first to release the tension of the tape in the tape recorder, thereafter to wind the take-up reel so that the recorded tape is wound past the cutter knife, thereafter to actuate the cutter knife through the cutter actuator cam to sever the tape, and subsequently to continue the winding of the recorded tape into the take-up cartridge.

A self feeding cartridge is provided which is effective to position itself and to engage and takeup magnetic tape fed into the cartridge. In accordance with one preferred type of take-up cartridge, there is provided a hub for engaging the take-up spindle. A thin shell is provided with an opening for admitting the tape. A compressible medium such as a spiral leaf spring is provided in the shell attached to the hub and having a friction drive engagement against the inner surface of the shell. The purpose of the compressible medium is to permit rotation of the cartridge as a unit for positioning, then to sandwich the leading edge of the tape against the shell in order to drag the edge at 360° around the inside of the shell at which time it is compressed around the hub by the first wrap of tape and serves no more useful purpose.

For a better understanding of the present invention, reference may be had to the accompanying drawings wherein.

Figure 15:
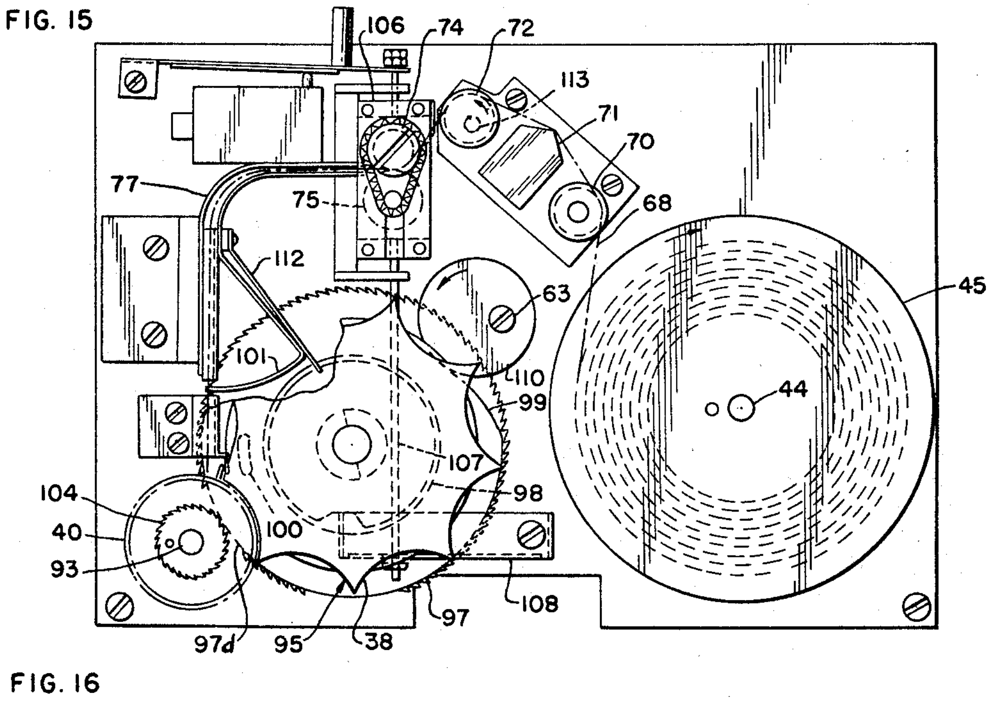
Figure 16:
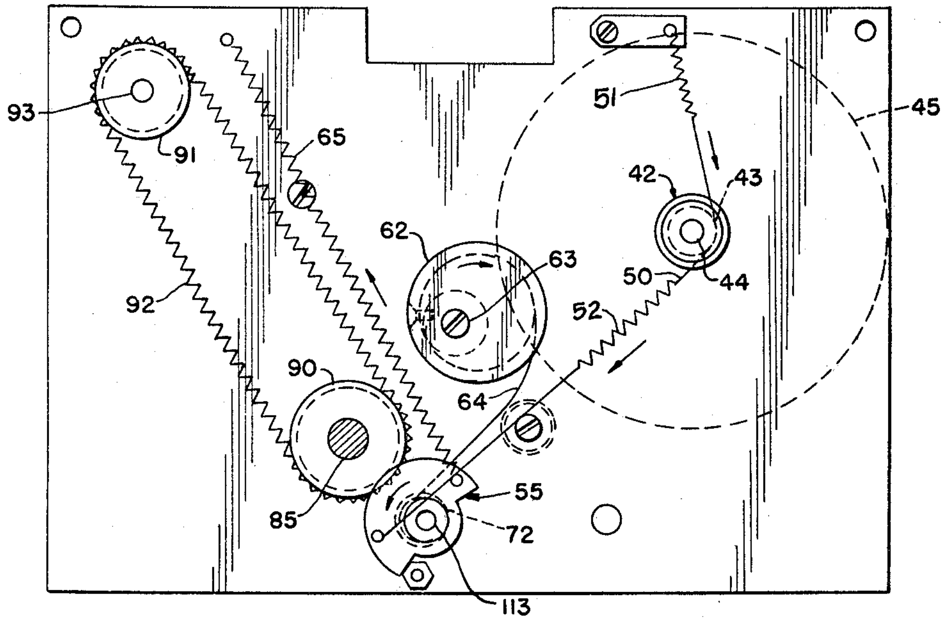

FIGS. 15 and 16 are top and bottom views respectively of the torque release mechanism according to the present invention illustrating the final step in the removal of recorded tape and showing the pretensioning of the tape prior to recording thereof; and FIGS. 17 through 23, inclusive, are detail views, partly in section, which illustrate the self positioning and self feeding cartridge according to the present invention.

Figure 1:
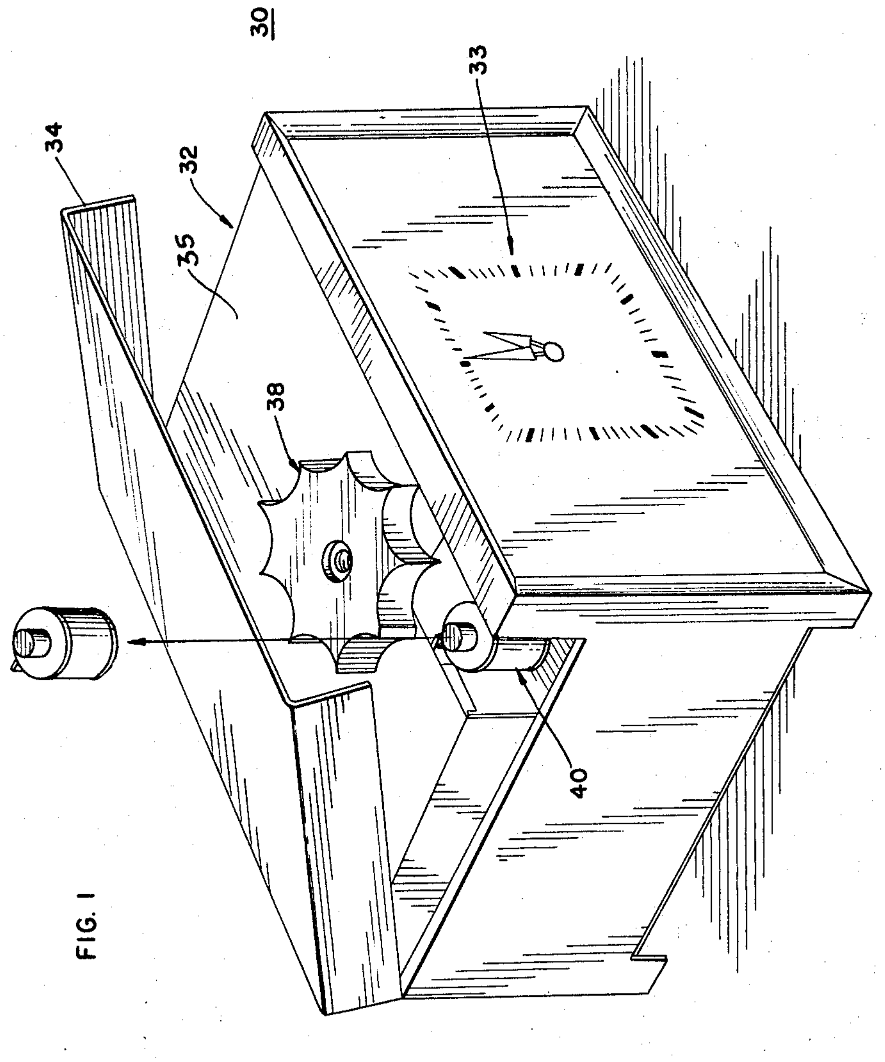
FIG. 1 is an exploded perspective view of a wave signal receiver monitor having an improved tape recorder according to the present invention.

Referring now to the drawings, and particularly to FIG. 1 thereof, there is illustrated a new and improved monitor for monitoring wave signal receivers such as television sets and the like and provided with an improved tape recorder 32 according to the present invention. The monitor 30 is provided with an electric clock 33 with a reset stem in the back of the monitor (not shown) such that the housewife or other operator will always have the correct time at the recorder to log the tape removal time. In addition the electric clock 33 makes the monitor 30 attractive so that it may be set in view on top of a home television set or like place.

The monitor 30 has a hinged upper cover 34 which, when open, exposes an inner cover 35 enclosing the tape track of the tape recorder 32, except for a manually actionable tape cut-off or hand knob 38 and a self positioning, self threading cartridge 40.

The illustrated arrangement of the monitor 30 permits the housewife or other unskilled person to perform some of the functions required in the field which makes it possible to reduce the labor required to service the monitor 30. More specifically, the housewife may perform the function of cutting off the tape by turning the tape cut-off knob 38, removing the take-up cartridge 40, recording on a mailing bag tag the end time of the tape (the time of cutting the tape) as indicated on the clock 33, putting on a new take-up cartridge 40, then putting the removed take-up cartridge into the mailing bag and posting the mailing bag.

Figure 2:
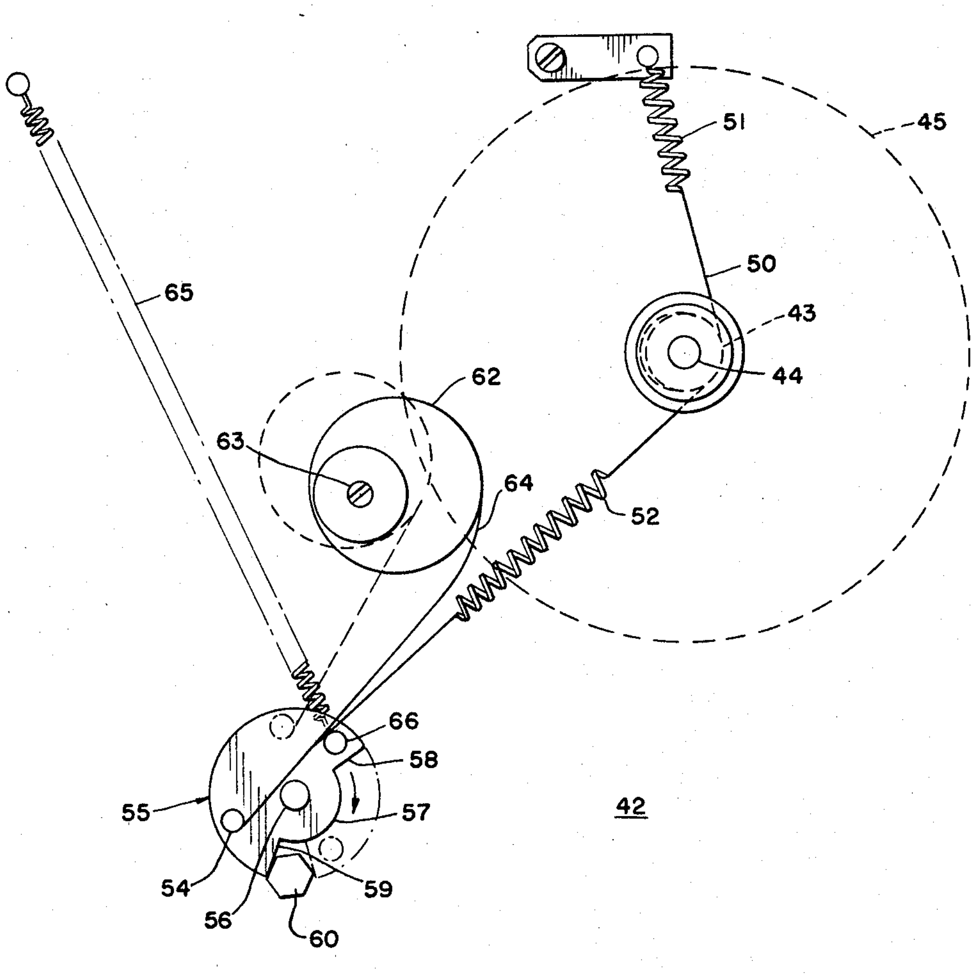
FIG. 2 is a plan view of the constant torque clutch of the tape drive according to the present invention.

In order to produce motion which will allow recording of characters of uniformly accurate spacing there is provided an intermittent motion to the tape. To properly guide the tape, however, since the magnetic tape used for recording is a very thin elastic ribbon which can be stretched a significant amount with comparatively little force, it is necessary to insure that the magnetic tape is under uniformly constant tension to produce a uniform and current amount of stretch. This is accomplished according to the present invention by pulling the tape from the supply which is governed by a constant unvarying torque clutch 42, best illustrated in FIG. 2. The torque clutch 42 is based on the observation that if a belt is wrapped around a cylinder through a sufficiently large angle, a change in the coefficient of friction between the belt and cylinder results in a relatively small change in the torque on the cylinder. Accordingly, the torque clutch 42 includes a clutch cylinder 43 on a reel spindle 44 adapted to receive a reel 45 of tape. A pin 46 fits in an aligning hole 47 (FIG. 5) of the reel 45 to key the reel 45 with the reel spindle 44. A belt 50 (FIG. 2) of thin stainless steel wire or other suitable material is wrapped around the clutch cylinder 43. Attached to each end of the belt are springs 51 and 52 respectively placing the belt 50 under tension around the cylinder 43. In the illustrated embodiment of the torque clutch, approximately three wraps of a very fine stainless steel wire belt 50 on a nylon or molybdenum disulfide filled nylon cylinder 43 gave very satisfactory results in diminishing slip-stick motion and in properly tensioning the tape.

As it is necessary during threading of the tape and in cut-off of the tape to release the tension on the tape, one end of the tensioning spring 52 is connected by a pin 54 to a pressure release cam 55. The pressure release cam 55 is rotatably mounted on a pin 56 and is provided with an arcuately recessed portion 57 providing cam stops 58 and 59 which abut against a pin stop 60 to provide for movement of the pressure release cam 55 between the tensioning position illustrated in solid in FIG. 2 to the released position illustrated in phantom therein. Rotation of the pressure release cam 55 between the position illustrated in solid in FIG. 2 to the position illustrated in phantom therein is effective to unload the tensioning of the springs 51 and 52 and release the torque on the clutch cylinder 43.

Rotation of the pressure release cam 55 is controlled by a pressure release pulley 62. The pressure release pulley 62 is eccentrically mounted on a cam crank 63 and is operatively connected to the pressure release cam 53 through a control cable 64, one end of which is wrapped around the pressure release pulley 62 and the other end of which is fastened to the pin 54. Rotation of the pressure release pulley 62 about the cam crank 63 is effective to rotate the pressure release cam 55 from the position illustrated in solid in FIG. 2 to the position illustrated in phantom therein. A tension spring 65 connected to a second pin 66 on the pressure release cam 55 is stretched by actuation of the pressure release cam 55 and is effective to return the pressure release cam 55 to its normal position when released by the pressure release pulley 62.

In order to drive tape 68 from the tape reel 45, the tape 68 is threaded along a tape path over a fixed tape guide 70, FIGS. 5, 7, 9, 11, 13, and 15, across a multi-channel recording head 71, around an eccentric tape guide 72, and between a drive roller or capstan 74 and a pressure roller 75. The tape leaving the capstan 74 follows through a tape guide 77 and is directed onto the take-up cartridge 40. A spring 78 biases the pressure roller 75 toward the capstan 74 to hold the tape 68 in driving engagement with the capstan 74. In the illustrated embodiment of the invention, the capstan 74 is a rubber coated metal shaft to provide adequate friction for driving the tape.

Figure 3:
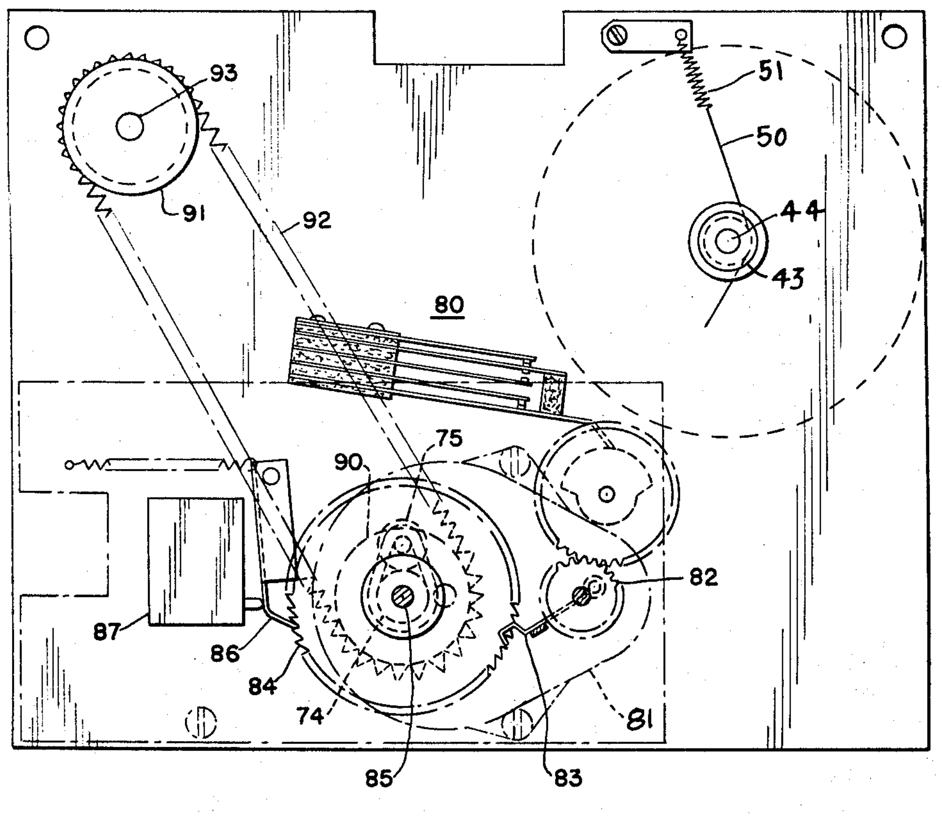
FIG. 3 is a plan view, somewhat schematic, of the tape drive of the tape recorder according to the present invention.

To drive the tape 68 past the recording head 71 in step by step motion, there is provided the tape drive mechanism 80 illustrated in FIG. 3. The prime mover for the tape advance during recording is a motor 81. In the illustrated embodiment of the invention, the motor 81 makes one revolution every two and one half minutes. The motor 81 drives an eccentric drive wheel 82 having a ratchet claw 83 eccentrically pivoted thereon. The ratchet claw 83 is biased into engagement with a ratchet wheel 84 drivingly connected to the capstan 74. The radial eccentricity of the ratchet claw 83 on the eccentric wheel 82 is approximately one half the spacing of the teeth on the ratchet wheel 84 so that during one half revolution of the eccentric wheel, the ratchet wheel 84 advances one tooth, and during the other half revolution of the eccentric wheel, the ratchet claw 83 moves to engage a second tooth. A ratchet pawl 86 engages the ratchet wheel to prevent reverse rotation of the ratchet wheel. This method of tape advance affords a very precise rotation, and as a result, effects very precise displacement of the tape from one recorded character to another. No gear train is involved with either possible eccentricity or wear so far as character spacing on the tape is concerned. Moreover the actual recording on the tape takes place when the ratchet pawl 86 drops off a tooth under the control of a ratchet switch 87. At this point, the tape is almost motionless and as a result static recording is achieved on the tape 68. A take-up pulley 90 mounted on the drive shaft 85 turns with the ratchet wheel 84 and is drivingly connected to a cartridge pulley 91 through a spring belt 92 which provides for slip and functions in a sense as a clutch. The cartridge pulley 91 in turn drives a cartridge spindle 93 which, in turn, carries the take-up cartridge 40. The cartridge 40 is overdriven at a rate faster than the capstan 74 supplies tape. In this manner the cartridge 40 supplies continuous tension on the tape 68 once take-up has begun. The overdrive additionally functions to position a new cartridge in time for tape to enter the opening thereof, then to insure engagement of the pulling mechanism and tape regardless of the start position thereof.

It is necessary to provide for periodically removing the recorded tape from the unit so that it may be processed at the processing facilities. In order to maintain uniform tape motion with accurate spacing of the recorded data, constant tension must be maintained from the instant the recording starts. This means that whenever recorded tape is removed from the unit, the remaining supply of unrecorded tape in the unit must remain in a threaded and tensioned or "ready to go" condition just as though no interruption had taken place. Moreover components of the recorder itself must remain in a tensioned condition, for example, the drive capstan is a rubber coated shaft and will twist under the tension of the tape.

To provide for the winding of the recorded tape, cut off at the end of the recording, release of the pressure during the winding, and reapplication of the tape tension, there is provided a manually controlled tape handling assembly 95 including the hand knob 38, a segmented gear 97 for winding the recorded tape onto the take-up cartridge 40, a capstan release cam 98 for releasing the pressure roller 75 from the capstan 74, and a torque release cam 99 for releasing the tension of the tape during the cutting and winding process. In addition the torque release cam 99 carries a tape cutter activator cam 100.

Referring first to the take-up of the tape on the cartridge 40, it will be understood that tape down track from the recorder head 71 will have been recorded on at some time prior to removal of the tape. Consequently when it is desired to remove the recorded tape, it is first necessary to wind such recorded tape past a tape cutter knife 101. This is accomplished by engagement of the segmented gear 97 with a pinion gear 104 secured on the cartridge spindle 93. The segmented gear 97 includes a first wind segment 97*a* (FIG. 7) which engages the pinion gear 104 to wind the tape 68 from the recording head 71 to down track of the knife 101. A first space 97*b* (FIGS. 9 and 11) provides a stop for the cartridge 40 during cutting of the tape. A second segment 97*c* (FIGS. 11 and 13) then concludes the winding of the tape 68 from the knife 101 after severing of the tape. A second space 97*d* (FIG. 15) permits normal operation of the cartridge 40 through the tape drive mechanism 80 of the tape recorder. It is understood that the spring belt 92 functions as a clutch to permit driving of the cartridge 40 by the segmented gear 97 while permitting slippage between the cartridge spindle 93 and the remainder of the tape drive mechanism 80.

To provide for the release of the tape 68 from pressure engagement with the capstan 74, the pressure roller 75 is mounted on a tape release bracket 106. As previously indicated that pressure roller 75 is biased toward the capstan 74 by the spring 78. A release rod 107 connects the tape release bracket 106 with a capstan release lever 108. The capstan release lever 108, in turn, rides on the surface of the capstan release cam 98. The capstan release cam 98 is provided with a lobe 98*a* and a detent 98*b* so that, when the capstan release lever 108 rides in the detent 98*b*, the pressure roller 75 is biased toward the capstan 74; however when the capstan release cam 98 rotates sufficiently to raise the capstan release lever 108 onto the lobe 98*a*, then the pressure roller 75 is pulled away from the capstan 74 to release the drive of the tape 68.

Figure 4:
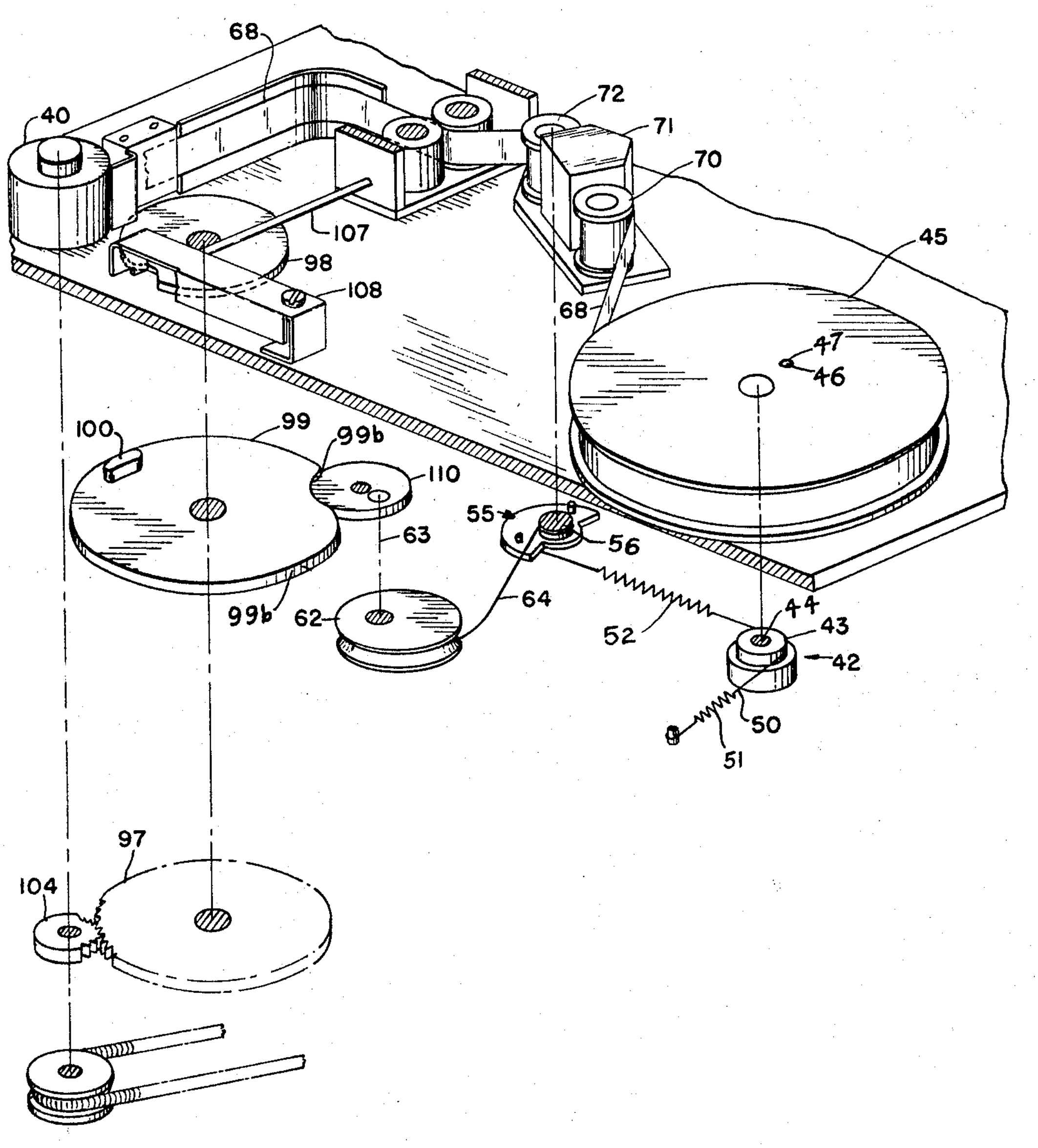
FIG. 4 is an exploded perspective view of the torque release mechanism according to the present invention.
Figure 5:
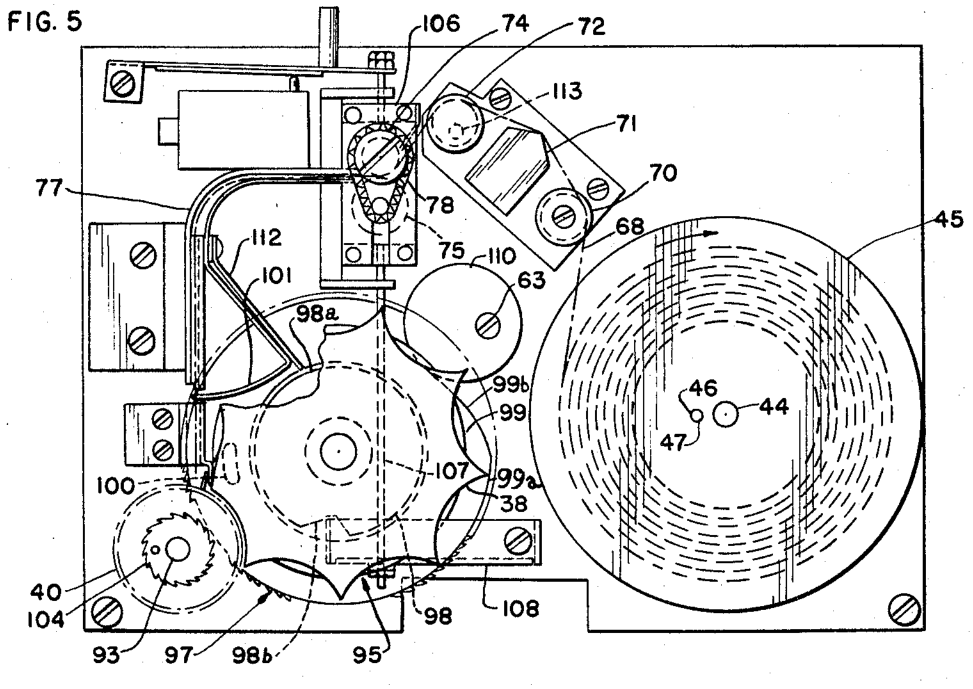
FIGS. 5 and 6 are top and bottom views respectively of the torque release mechanism according to the present invention and illustrated with the tape in the normal recording position.
Figure 7:
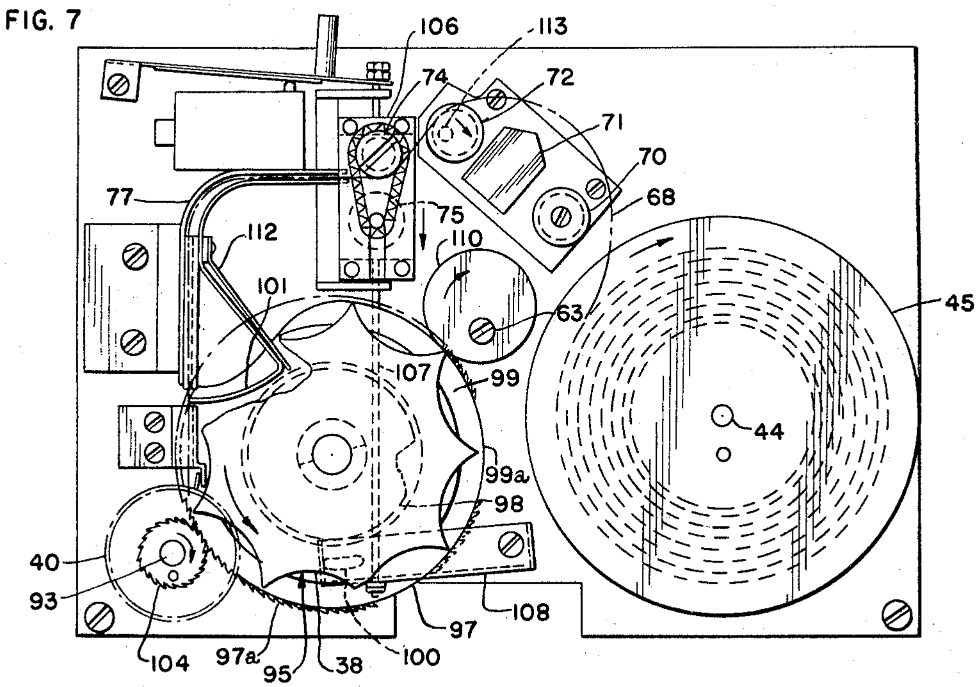
FIGS. 7 and 8 are top and bottom views respectively of the torque release mechanism according to the present invention and illustrated with the tension of the tape released at the initial step in the removal of the recorded tape.

Pretensioning of the tape 68 and release of the torque on the constant torque clutch 42 is under the control of the torque release cam 99. More specifically the torque release cam is provided with a high lobe 99*a* and a recessed portion 99*b* (FIGS. 5 and 7). A release pulley drive cam follower 110 rides on the lobes of the cam 99 and may be generally disc-shaped eccentrically mounted on the cam crank 63. Pivoting of the drive cam follower 110 is effective to pivot the pressure release pulley 62 and the pressure release cam 55 to release the load on the torque clutch 42. Moreover the eccentric tape guide 72 is eccentrically mounted on a guide shaft 113 for rotation with the pressure release cam 55, as best illustrated in FIG. 4. Consequently movement of the pressure release cam 55 from the tensioning position illustrated in solid in FIG. 2 to the released position illustrated in phantom therein is effective to move the eccentric tape guide 72 from a projected position extending into the path of the tape 68 to a retracted position out of the path thereof. Return of the pressure release cam 55 to its normal position is effective to project the guide 72 into the tape track thereby pulling an initial supply of tape 68 from the reel 45 to pretension the tape 68 prior to the recording thereon.

Figure 9:
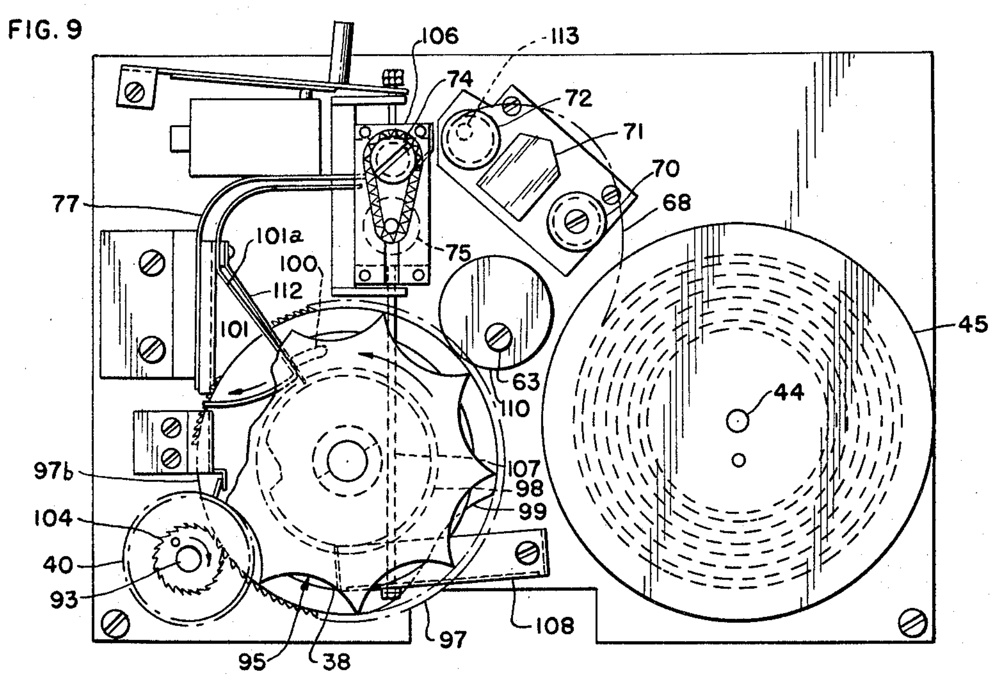
FIGS. 9 and 10 are the top and bottom views respectively of the torque release mechanism according to the present invention and illustrated with the recorded tape wound past the cut-off knife in the tape removal step of the present invention.
Figure 10:
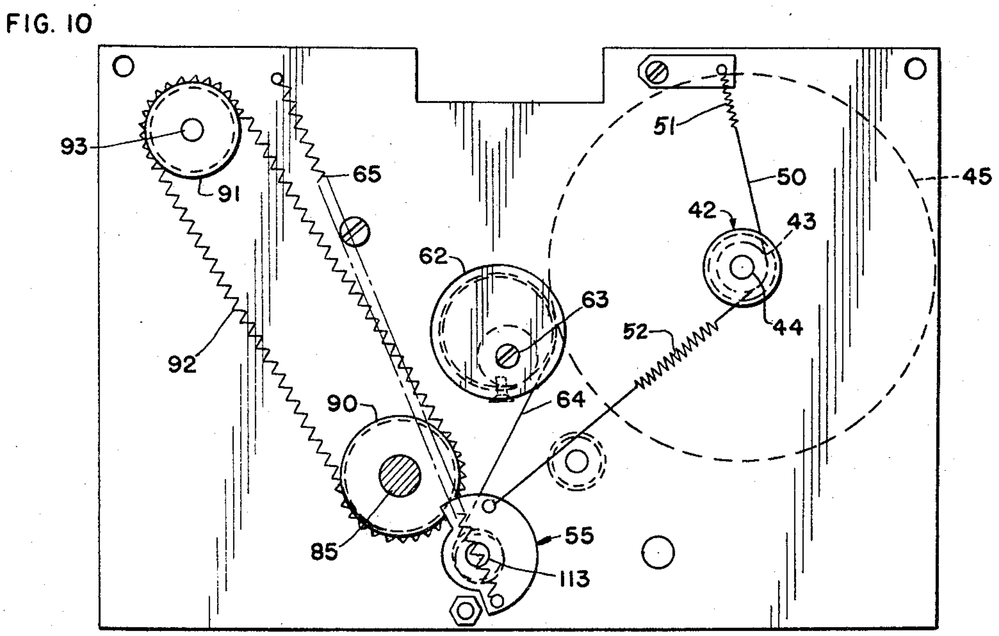
Figure 11:
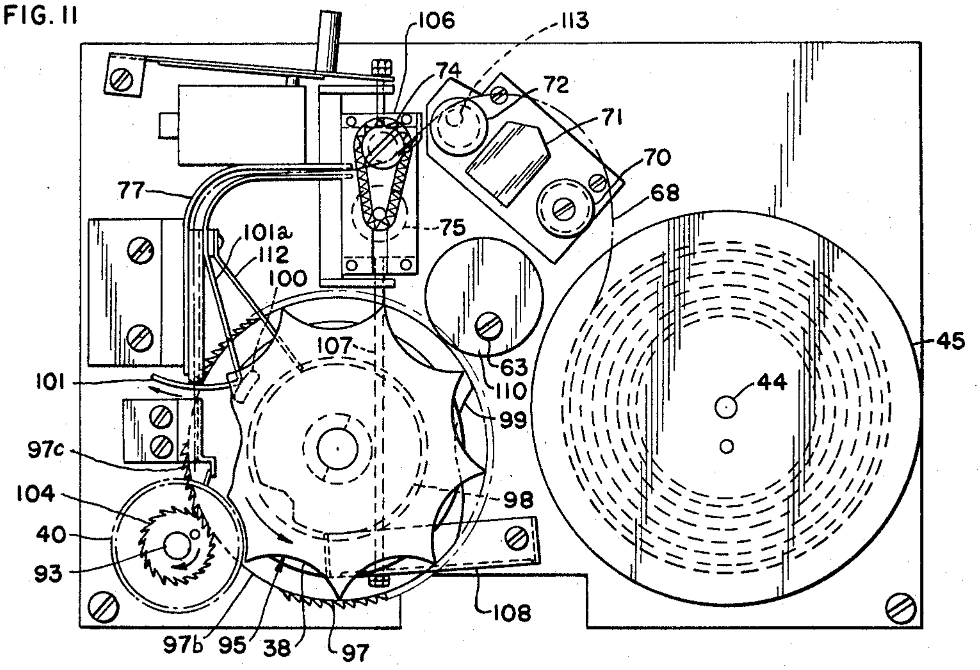
FIGS. 11 and 12 are top and bottom views respectively of the tape release mechanism according to the present invention and illustrating the cutting of the recorded tape during the removal of the recorded tape from the tape recorder.
Figure 12:
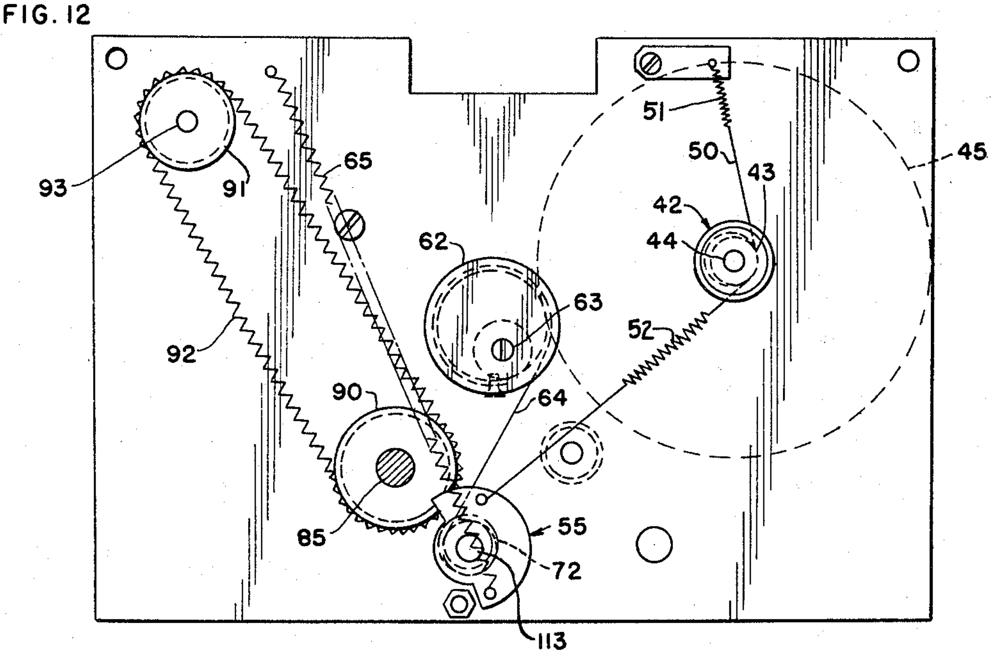

The tape 68 is cut or severed by the tape cutter knife 101. More specifically the tape cutter knife 101 has a suitable cutting edge at its leading edge and is formed with a suitable leaf spring support 101*a* (FIGS. 9, 11), which is effective to bias the knife 101 into the withdrawn or inoperative position illustrated in FIG. 9. The tape cutter activator cam 100, when rotated, is effective to strike the spring support 101*a*, as illustrated in FIG. 9, and drive the cutting edge of the knife 101 across the tape track at the edge of the guide 77, to the position illustrated in FIG. 11. It will be noted that during the movement of the knife across the take track, the pinion gear 104 idles in the space 97*b* of the segmented gear 97 so that the tape 68 is not moving along its tape path but is fixed. A knife back stop 112 positions the knife 101 on its return stroke.

Figure 6:
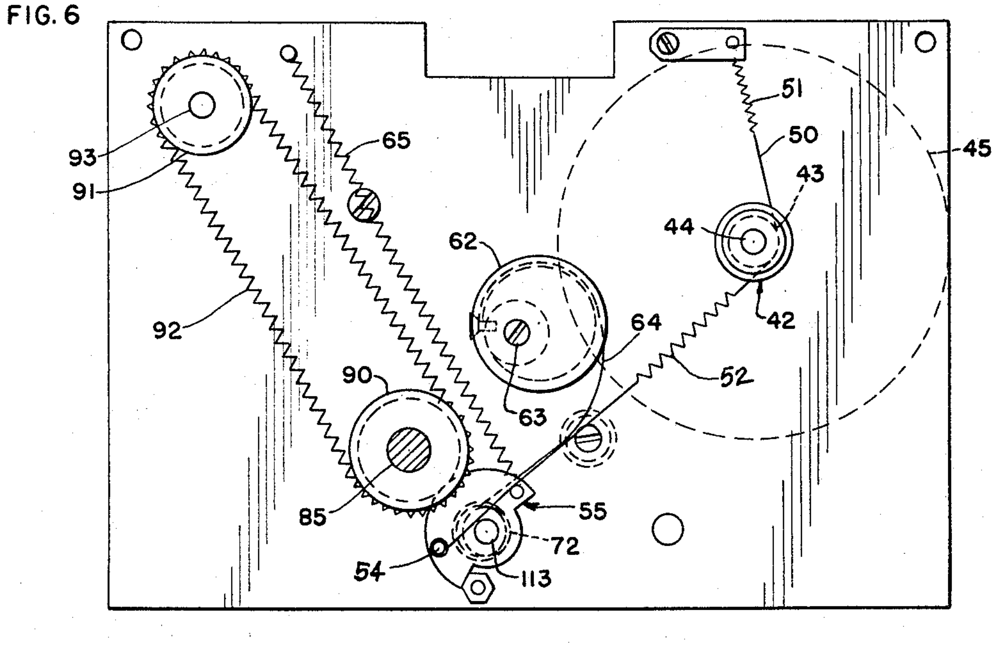

From the above detailed description, the operation of the tape handling mechanism providing for the removal of the recorded tape is believed clear. However, briefly, it will be understood that FIGS. 5 and 6 illustrate the normal recording position of the tape handling mechanism. The pressure roller 75 is biased against the capstan 74, the torque clutch 42 is operative to apply a substantially constant torque to the reel 45, the eccentric guide 113 is projected into the path of the tape 68, and the knife 101 is retracted from the track path. The tape is advanced in a step by step movement by the tape drive mechanism 80, the cartridge 40 being driven by the spring belt 92.

Figure 8:
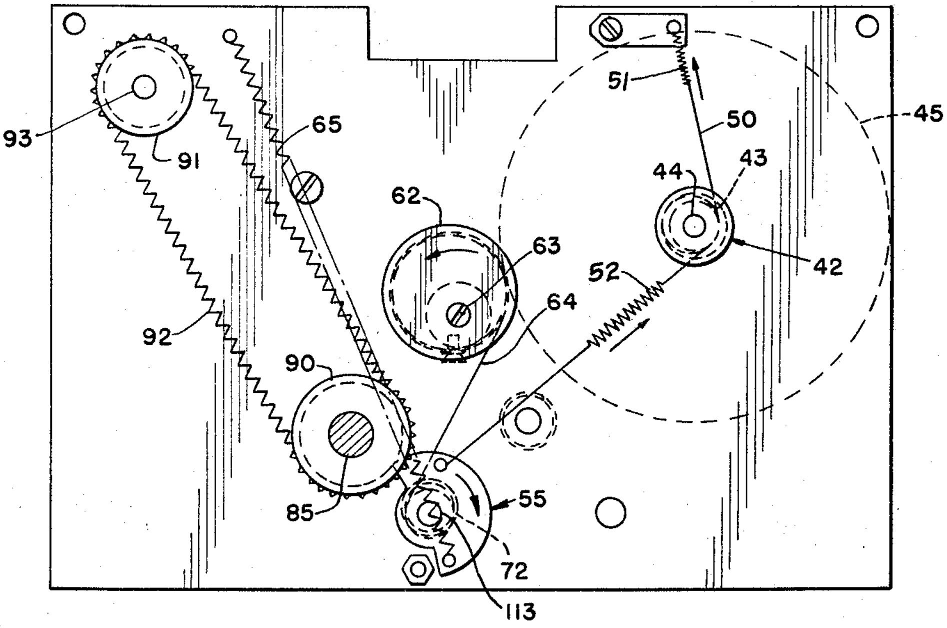

When it is desired to remove the recorded tape, the hand knob 38 is rotated counterclockwise as illustrated in FIGS. 7 and 8. Initial movement of the hand knob 38 is effective to raise the capstan release lever 108 from the detent 98*b* to release the pressure between the pressure roller 75 and the capstan 74 and thereby free the tape. At the same time the drive cam follower 110 is pivoted clockwise by the action of the torque release cam 99 which in turn is effective first to release the load on the torque clutch 42 and simultaneously therewith to retract the eccentric guide 72. At the same time the segment 97*a* of the segmented gear 97 engages the pinion gear 104 driving the cartridge 40 to advance the tape from the recording head 71 to a point past the cutting knife 101. The cartridge 40 can be driven relative to the tape drive mechanism 80 since the spring belt 92 will function as a drive to permit relative slippage between the pulleys 90 and 91.

Further advance of the hand knob 38 in a counterclockwise direction is effective to bring the tape cutter activator cam into engagement with the tape cutter knife 101, as best illustrated in FIG. 9, to initiate the cutting stroke of the cutter 101. At the same time the segment 97a of the segmented cam 97 has been driven to its edge, so that it will disengage from the pinion gear 104. Continued rotation of the hand knob 38 will driven the knife 101 across the tape path, as best illustrateed in FIG. 11, thereby severing the recorded tape. During the severing step of the tape handling process, the space 97b between the segments 97a and 97c of the segmented gear 97 turns past the pinion gear 104 so that the pinion gear is not driven.

Figure 13:
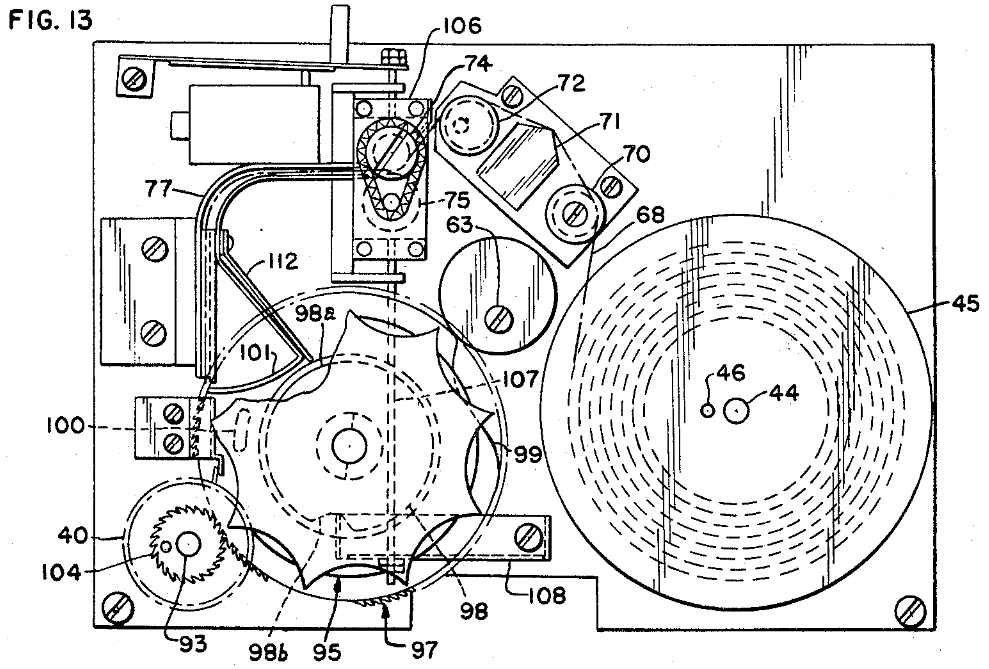
FIGS. 13 and 14 are top and bottom views respectively of the torque release mechanism according to the present invention illustrating the gripping of the tape between the pressure roller and capstan prior to the pretensioning of the tape.
Figure 14:
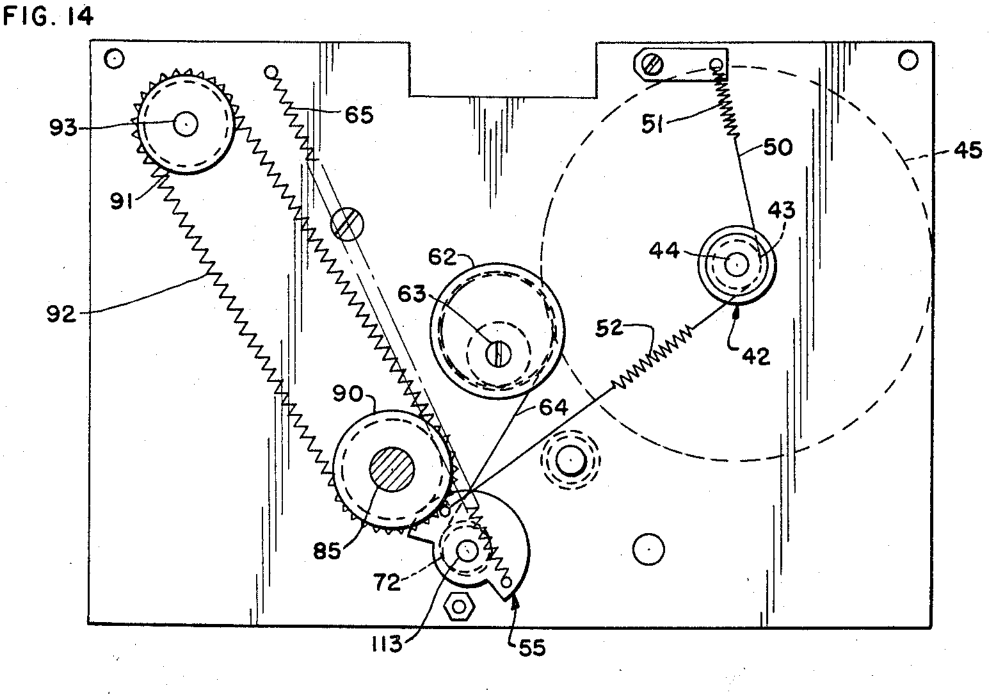

Further continued rotation of the hand knob 96 will drive the tape cutter activator cam 100 past the edge of the knife 101 to permit the knife 101 to return to its normal position, as best illustrated in FIG. 13. Moreover the second segment 97c of the segmented gear 97 will come into engagement with the pinion gear 104. Continued rotation of the hand knob 38 will permit the capstan release lever 108 to drop into the detent 98b and reapply pressure between the pressure roller and the capstan to hold the tape 68.

Further movement of the hand knob in a counterclockwise direction to return it to its initial position will permit the drive cam follower 110 to pivot counterclockwise, thereby restoring the force to the torque clutch 42 and pivoting the eccentric tape guide 72 into the tape path to pull a small section of magnetic tape from the reel 45 thereby pretensioning the magnetic tape. It will be observed that the space 97d in the segmented gear 97 is now aligned with the pinion gear 104 permitting the cartridge 40 to be driven through the tape drive mechanism 80.

Once the recorded tape has been severed and wound by a single turn of the hand knob 38, the cartridge 40 may be merely lifted up off the cartridge spindle 93, and a new empty cartridge dropped into place. The new cartridge 40 will be self aligning and self feeding so that the tape will automatically be wound within the cartridge. One suitable embodiment of a self feeding cartridge is illustrated in FIGS. 17 through 23. More specifically the self feeding cartridge 40 therein illustrated includes a central hub 115 which locks or keys in a suitable manner onto the cartridge spindle 93. The hub 115 is contained within a thin outer shell 116 having an opening 117 for receiving the tape 68. Moreover the shell includes a locating stop 118 which is effective to come against a positioning stop 119 to locate the cartridge 40. A compressible medium, here illustrated as a spiral leaf spring 120 has one end fastened to the hub 115 and carries suitable friction material 121 on the other end engaging the inner surface of the shell 116.

Figure 17:
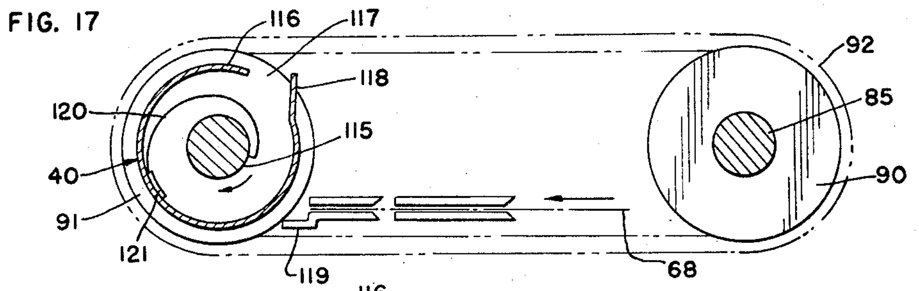
Figure 18:
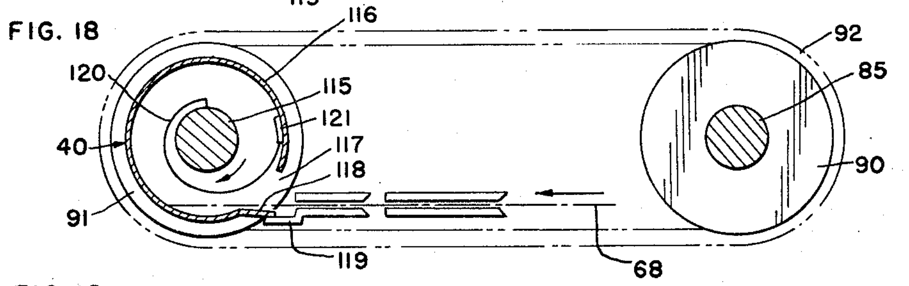
Figures 19, 20, 21:
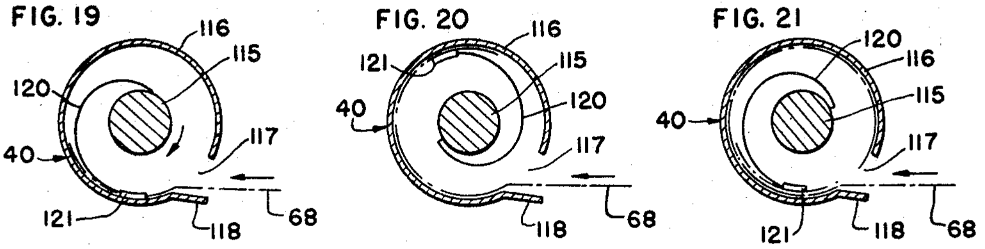
Figure 22:
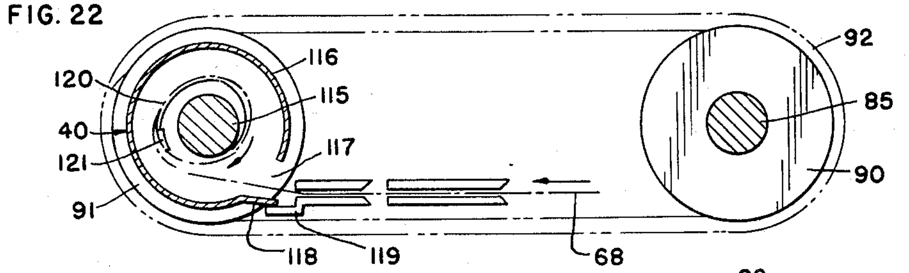
Figure 23:
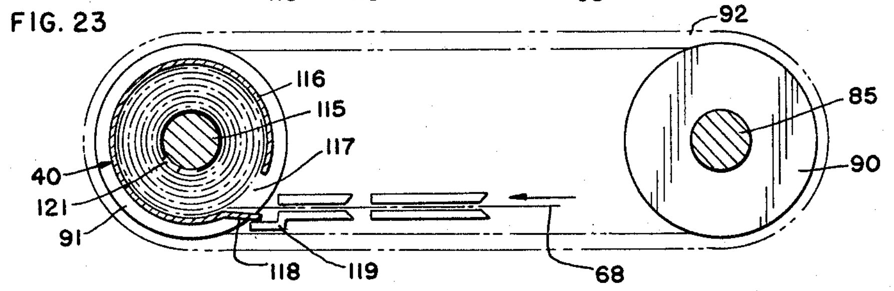

The operation of the self feeding cartridge will be apparent from the illustrations of FIGS. 17 through 23. However, briefly, FIG. 17 illustrates the cartridge 40 placed on the cartridge spindle 93 and rotating as a unit through the driven spring belt 92 to position itself. There is a large enough overdrive ratio to insure that the cartridge will always position itself before the tape 68 emerges from the guide 77 regardless of the initial cartridge position. The shell 116 of the cartridge 40 will rotate clockwise as viewed in FIG. 17 until the locating stop 118 comes against the positioning stop 119. Thereupon the shell 116 will be held stationary while the hub 115 with the spring 120 will continue rotation. Once the shell 116 has come to a stop, the shell is in proper position to allow the tape 68 to enter through the opening 117. Thereafter the pull-in spring 120 will engage the leading edge of the tape 68 by way of the friction material 121, which, in one embodiment, may comprise a rubber coating. As the spring and hub assembly rotate, the tape 68 is pulled around the inside of the shell. Since the cartridge is overdriven with respect to the capstan, the spring 120 tends to pull the tape faster than the capstan supplies it, therefore sustaining the tape 68 under tension. In the case of one embodiment, the spring actually slipped on the tape and several initial rotations were necessary to complete the first 360° wrap of the tape. Once the first wrap of the tape has completed itself, an overlapped portion of the tape will begin to slip on itself, as illustrated in FIG. 21. The first wrap of the tape 68 now acts as the shell of the cartridge and the spring will continue pulling the leading edge of the tape around the shell, but without slippage. The spring continues to pull the leading edge of the tape around the inside of the first wrap and will then pull the first wrap in around itself as illustrated in FIG. 22. The first wrap can be considered slack tape and therefore all excess motion due to overdrive has to result in compression of the spring. Once the spring 120 has been compressed tightly around the hub 115, then successive wraps of tape will continue to wind around each preceding wrap. The motion of the overdrive results in slippage of the spring belt 92 which in turn maintains constant tension on the tape 68.

The illustrated cartridge 40 is shown with a spring 120 as the compressible medium attached to the hub. Nevertheless it has been found that other compressible mediums such as a doughnut shaped soft flexible plastic or rubber foam member work satisfactorily and additionally have the advantage that they pull the tape continuously.

Although the present invention has been described by reference to only a single embodiment thereof, it will be apparent that numerous other modifications and embodiments will be devised by those skilled in the art which will fall within the true spirit and scope of the present invention.

What is claimed as new and desired to be secured by Letters Patent of the United States is:

1. A constant torque clutch for a tape reel comprising a clutch cylinder rotatable about a stationary axis, means mounting the tape reel for rotation with said cylinder, wire means wrapped more than one turn around said cylinder and having ends spaced from said cylinder, and a pair of tension springs connected to said opposite ends of said wire for tensioning said wire.

2. A constant torque clutch as set forth in claim 1 above and additionally including means for releasing said springs to permit free movement of said clutch cylinder.

3. A constant torque clutch for a tape reel comprising a reel spindle, a nylon clutch cylinder drivingly connected to said spindle, a stainless steel wire belt means wound approximately three wraps around said clutch cylinder, and a pair of tension springs tensioning opposite ends of said belt means.

4. A tape drive assembly for a tape recorder mechanism comprising a tape drive capstan, a ratchet wheel drivingly connected to said capstan, an eccentric drive wheel, a ratchet claw eccentrically pivoted on said eccentric drive wheel, means biasing said ratchet claw into engagement with said ratchet wheel, the eccentricity of said ratchet claw on said drive wheel being approximately one half the spacing of the teeth in said ratchet wheel whereby one revolution of said eccentric drive wheel advances said ratchet wheel one tooth, a ratchet pawl engaging said ratchet wheel to prevent reverse rotation of said ratchet wheel, a drive motor drivingly connected to said eccentric drive wheel, a take-up spindle for a tape cartridge, a belt pulley drivingly connected to said spindle, a belt pulley drivingly connected to said ratchet wheel, and belt means interconnecting said pulleys, said belt means driving said spindle at a speed to overdrive said spindle relative to the speed of said capstan.

5. A tape drive assembly for a tape recorder mechanism comprising a tape drive capstan, a ratchet wheel drivingly connected to said capstan, a drive wheel, a ratchet claw eccentrically pivoted on said drive wheel, means biasing said ratchet claw into engagement with said ratchet wheel, the eccentricity of said ratchet claw on said drive wheel being approximately one half the spacing of the teeth on said ratchet wheel whereby one revolution of said drive wheel advances said ratchet wheel one tooth, pawl means engaging said ratchet wheel, and a constant speed continuously rotating drive motor drivingly connected to said drive wheel.

6. A tape drive assembly for a tape recorder mechanism comprising a drive capstan, ratchet means drivingly connected to said capstan, a drive member, a ratchet means pivoted eccentrically on said drive member, means biasing said ratchet means into engagement with said ratchet wheel, pawl means engaging said ratchet wheel, and constant speed continuously rotating drive means drivingly connected to said drive member.

7. A release mechanism for a tape recorder adapted to advance a recording tape from a reel to a take-up means along a tape track and comprising a reel spindle, a constant torque clutch operatively connected to said spindle for applying a load to the recorder tape, a crank, a recording head including a guide eccentrically mounted on said crank normally projected into the tape track to lengthen the path of the tape track and retractable to shorten the path of said tape track, a drive capstan, a pressure roller, means for biasing said pressure roller relatively towards said drive capstan to drivingly hold the tape against said capstan, means for moving said pressure roller away from said capstan to release the tape, means for rotating said crank selectively to project and retract said roller, and means for releasing the torque on said constant torque clutch.

8. A release mechanism as set forth in claim 7 above and additionally including means for simultaneously actuating the last two mentioned means.

9. A release mechanism as set forth in claim 8 above wherein the last mentioned means includes a pressure release cam mounted on said crank and pivotable between a first position projecting said tape drive and tensioning said torque clutch to a second position retracting said tape drive and releasing said torque clutch.

10. A release mechanism as set forth in claim 7 above and including means for sequentially effecting release of said pressure roller for bias toward said drive capstan, and thereafter effecting actuation of said last two mentioned means for applying load to said constant torque clutch and unwinding a section of recording tape therefrom to pretension said recording tape.

11. A release mechanism for a tape recorder adapted to advance a recording tape from a reel to a take-up means along a tape track and comprising a reel spindle, a clutch cylinder drivingly connected to said spindle, belt means wrapped around said cylinder, a pair of tension springs loading opposite ends of said belt, a crank, a recording head including a tape guide eccentrically mounted on said crank normally projected into the tape track to lengthen the path of the tape track and retractable to shorten the path of said tape track, a drive capstan, a pressure roller, means for biasing said pressure roller towards said drive capstan to drivingly hold the tape against said capstan, means for moving said pressure roller away from said capstan to release the tape, means for rotating said crank selectively to project and retract said roller, and means for releasing the tension on said pair of springs for releasing the torque on said constant torque clutch.

12. A release mechanism as set forth in claim 11 above wherein said last two mentioned means includes a pressure release cam mounted to said crank for rotating said crank and said tape guide, and wherein one end of one of said springs is fastened to said pressure release cam, rotation of said pressure release cam in a first direction being effective to retract said guide and release the tension on said springs, and rotation of said pressure release cam in the opposite direction being effective to project said guide and tension said springs.

13. A release mechanism as set forth in claim 12 above and additionally including a cam crank, a pressure release pulley eccentrically mounted on said cam crank, a control cable connecting said cam crank to said pressure release cam to rotate said pressure release cam in said first direction, and additionally including a tension spring connected to said pressure release cam for rotating said pressure release cam in a second direction against the bias of the first mentioned springs.

14. A release mechanism for a tape recorder adapted to advance a recording tape from a reel to a take-up means along a tape track and comprising a reel spindle, a constant torque clutch operatively connected to said spindle for applying a tension to the recorder tape, a crank, a recording head including a tape guide eccentrically mounted on said crank normally projected into the tape track to lengthen the path of the tape track and retractable to shorten the path of said tape track, means for rotating said crank selectively to project and retract said roller, and means for releasing the torque on said constant torque clutch.

15. A release mechanism for a tape recorder adapted to advance a recording tape from a reel to a take-up means along a tape track and comprising a reel spindle, a constant torque clutch operatively connected to said spindle for applying a tension to the recorder tape, a recording head, a drive capstan, a pressure roller, means for biasing said pressure roller toward the drive capstan to drivingly hold the tape against said capstan, means for moving said pressure roller away from said capstan to release said tape, and means for releasing the torque on said constant torque clutch.

16. A release mechanism for a tape recorder adapted to advance a recording tape from a reel to a take-up means along a tape track and comprising a reel spindle, a crank, a recording head including a tape drive eccentrically mounted on said crank normally projected into the tape track to length the path of the tape track and retractable to shorten the path of said tape track, a drive capstan, a pressure roller, means for biasing said pressure roller towards a drive capstan to drivingly hold the tape against said capstan, means for moving said pressure roller away from said capstan to release the tape, and means for rotating said crank selectively to project and retract said roller.

17. A release mechanism for a tape recorder adapted to advance a tape from a reel to a take-up means along a tape track and comprising a reel spindle, a constant torque clutch operatively connected to said spindle for applying a tension to the recorder tape, a crank, a recording head including a tape guide eccentrically mounted on said crank normally projected into the tape track to lengthen the path of the tape track and retractable to shorten the path of said tape track, a drive capstan, a pressure roller, means for biasing said pressure roller toward said drive capstan to drivingly hold the tape against said capstan, a manually controlled tape handling assembly including a capstan release cam and a torque release cam, a roller release lever follower riding on said roller release cam and operatively connected to move said pressure roller away from said capstan to release the tape from said capstan, a release pulley drive cam follower riding on said torque release cam, an eccentrically mounted pressure release pulley operatively connected to said drive cam follower, an oscillatory pressure release cam mounted of said crank, connector means operatively interconnecting said pressure release cam and said pressure release pulley, and means interconnecting said pressure release cam and said constant torque clutch whereby movement of said pressure release cam is effective to retract said eccentrically mounted tape drive and to release the torque on said constant torque clutch.

18. A release mechanism for a tape recorder adapted to advance a recording tape from a reel to a take-up means along a tape track and comprising a reel spindle, a constant torque clutch operatively connected to said spindle for applying a tension to the recorder tape, a crank, a recording head including a tape guide eccentrically mounted on said crank normally projected into the tape track to lengthen the path of the tape track and retractable to shorten the path of said tape track, a drive capstan, a manually controlled tape handling assembly including a torque release cam, a release pulley drive cam follower riding on said torque release cam, an eccentrically mounted pressure release pulley operatively connected to said drive cam follower, an oscillatory pressure release cam mounted on said crank, connector means operatively interconnecting said pressure release cam and said pressure release pulley, and means interconnecting said pressure release cam and said constant torque clutch whereby movement of said pressure release cam is effective to retract said eccentrically mounted tape guide and to release the torque on said constant torque clutch.

19. A release mechanism for a tape recorder adapted to advance a recording tape from a reel to a take-up means along a tape track and comprising a crank, a recording head including a tape guide eccentrically mounted on said crank normally projected into the tape track to lengthen the path of the tape track and retractable to shorten the path of said tape track, a drive capstan, a pressure roller, means for biasing said pressure roller toward a drive capstan to drivingly hold the tape against said capstan, a manually controlled tape handling assembly including a capstan roller release cam and a torque release cam, a roller release lever follower riding on said roller release cam and operatively connected to move said pressure roller away from said capstan to release the tape from said capstan, a release pulley drive cam follower riding on said torque release cam, an eccentrically mounted pressure release pulley operatively connected to said drive cam follower, an oscillatory pressure release cam mounted on said crank, and connector means operatively interconnecting said pressure release cam and said pressure release pulley, rotation of said pressure release cam being effective to project and retract said guide to tension the tape in said tape recorder.

20. A tape cut-off mechanism for a tape recorder including a take-up spindle for a tape cartridge, drive means, clutch means interconnecting said drive means and said spindle, a pinion gear mounted on said spindle, a multi-segment manually driven segmented gear operatively associated with said pinion gear, a tape cutter knife projectable across the tape track of said tape recorder, and a tape cutter actuator cam carried by said segmented gear operatively associated with said tape cutter knife to project said knife across the tape track, said segmented gear and said tape cutter actuator being programmed with said pinion gear normally rotatable in a space between segments and said knife normally retracted from said tape track, initial manual rotation of said segmented gear being effective to engage said pinion gear with a toothed segment thereof to advance said tape from the recording head of said recorder to beyond said knife, said pinion gear then idling in another space of said segmented gear while said tape cutter activator cam engages said knife to project said knife across said tape track, further rotation of said segmented gear being effective to again engage said pinion gear with another toothed segment thereof to complete winding of the severed tape onto the tape cartridge.

21. A tape cut-off mechanism for a tape recorder including a cartridge spindle, a pinion gear mounted on said spindle, a segmented gear operatively associated with said pinion gear, a tape cutter means, tape cutter actuator means operatively associated with said segmented gear, said segmented gear being programmed with said pinion gear and said tape cutter actuator means so that initial manual rotation of said segmented gear is effective to engage said pinion gear with a toothed segment thereof to advance said tape from the recording head of said recorder to beyond said cutter means, said pinion gear then idling in a space of said segmented gear while said tape cutter actuator means is effective to actuate said tape cutter means, and continued rotation of said segmented gear being effective to again engage said pinion gear with another toothed segment thereof to complete winding of the severed tape onto the tape cartridge.

22. In a tape handling mechanism for a tape recorder of the type including a take-up spindle for a tape cartridge, a tape reel spindle for a tape reel, torque clutch means operatively associated with said tape reel spindle, a capstan for driven tape, pressure means for rendering said capstan effective and ineffective to drive tape; the improvement including means for releasing said pressure means to render said pressure means ineffective, means for releasing said torque clutch to permit said reel spindle to rotate freely, means for driving said take-up spindle to wind a portion of tape, means for cutting said tape, means for rendering said pressure means effective to drive said tape, means for engaging said torque clutch, and means for pretensioning tape by unwinding a small portion thereof from said reel against the bias of said torque clutch.

References Cited

UNITED STATES PATENTS

| | | | |
|---|---|---|---|
| 3,000,591 | 9/1961 | Bucklin | 242—155 |
| 3,080,133 | 3/1963 | Muller | 242—155 |
| 3,084,883 | 4/1963 | Buck | 242—71.1 |
| 3,125,309 | 3/1964 | Moyano | 226—157 X |
| 2,630,716 | 3/1953 | Depweg | 74—10.7 |

FOREIGN PATENTS

| | | |
|---|---|---|
| 407,937 | 3/1934 | Great Britain. |

LEONARD D. CHRISTIAN, *Primary Examiner.*